United States Patent
Yanagawa et al.

(10) Patent No.: US 9,150,192 B2
(45) Date of Patent: Oct. 6, 2015

(54) WEBBING TAKE-UP DEVICE

(75) Inventors: Wataru Yanagawa, Aichi-ken (JP);
Masaru Ukita, Aichi-ken (JP); Yoshiaki Maekubo, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 1043 days.

(21) Appl. No.: 13/160,203

(22) Filed: Jun. 14, 2011

(65) Prior Publication Data
US 2011/0309181 A1    Dec. 22, 2011

(30) Foreign Application Priority Data

Jun. 16, 2010    (JP) ................................ 2010-137552
Jun. 3, 2011     (JP) ................................ 2011-125092

(51) Int. Cl.
*B60R 22/34* (2006.01)
*B60R 22/28* (2006.01)

(52) U.S. Cl.
CPC ....... *B60R 22/3413* (2013.01); *B60R 2022/287* (2013.01); *B60R 2022/288* (2013.01)

(58) Field of Classification Search
CPC .. B60R 22/341; B60R 22/3413; B60R 22/36; B60R 22/38; B60R 22/40; B60R 22/405; B60R 22/46; B60R 22/4676; B60R 2022/468
USPC .............................. 242/374, 379.1, 383, 384; 280/805–807; 297/470–472, 476–478
See application file for complete search history.

(56) References Cited

U.S. PATENT DOCUMENTS

| | | | | |
|---|---|---|---|---|
| 4,258,887 A  *  | 3/1981 | Fohl et al. | ................. | 242/383.2 |
| 4,565,338 A  *  | 1/1986 | Takada | ........................ | 242/382.2 |
| 6,015,164 A  *  | 1/2000 | Yano | ............................. | 280/806 |
| 6,352,213 B1 *  | 3/2002 | Sumiyashiki et al. | ..... | 242/383.2 |
| 2003/0116668 A1* | 6/2003 | Sumiyashiki | ................. | 242/376 |
| 2004/0075008 A1* | 4/2004 | Mori et al. | ................. | 242/390.8 |
| 2007/0290091 A1* | 12/2007 | Mori | ......................... | 242/383.1 |
| 2008/0203210 A1* | 8/2008 | Nagata et al. | .............. | 242/396.1 |

FOREIGN PATENT DOCUMENTS

JP        2007084042        4/2007

* cited by examiner

*Primary Examiner* — Emmanuel M Marcelo
*Assistant Examiner* — Justin Stefanon
(74) *Attorney, Agent, or Firm* — Roberts Mlotkowski Safran & Cole P.C.

(57) ABSTRACT

A coil spring is provided in a compressed state between a coupling wall section provided at a clutch guide and an inner-side locking section. The clutch guide is provided with a support section which supports one axial-direction end section of the coil spring from a side opposite to the clutch cover in an axial direction of the clutch guide. The clutch cover is provided with a leading-end protruding section which is projected with respect to the inner-side locking section so as to be inserted in the other axial-direction end section of the coil spring. The leading-end protruding section is inclined, with respect to a direction orthogonal to an axial direction of the clutch cover, toward a support section side, so that the coil spring is curved so as to be convex to the support section side.

6 Claims, 13 Drawing Sheets

WEBBING TAKE-UP DEVICE

CROSS-REFERENCE TO RELATED APPLICATION

This application claims priority under 35 USC 119 from Japanese Patent Application No. 2010-137552 filed on Jun. 16, 2011 and No. 2011-125092 filed on Jun. 3, 2011, the disclosure of which is incorporated by reference herein.

BACKGROUND

1. Technical Field

The present invention relates to a webbing take-up device.

2. Related Art

In a webbing take-up device disclosed in Japanese Patent Application Laid-Open (JP-A) No. 2007-84042, a torsion shaft is fixed to a spool so as to be rotatable integrally therewith. On one end side of the torsion shaft, a second lock base is fixed so as to be integrally rotatable, and a circular plate is supported so as to be relatively rotatable.

The second lock base is provided with a spring accommodating hole, and a spring (coil spring) is accommodated in the spring accommodating hole. The spring is provided in a compressed state between one inner wall in the spring accommodating hole and a plate formed at the circular plate.

Further, second lock pawls are turnably supported by the second lock base, and guide pins projecting from the circular plate are movably engaged with elongated holes respectively formed at the second lock pawls.

When a stopper inserted between another inner wall in the spring accommodating hole and the plate is retracted so that the circular plate is rotated relatively to the second lock base, the guide pins move in the elongated holes. Accordingly, the second lock pawls are turned to an outer side of the second lock base so that the second lock pawls are engaged with a lock ring formed around the second lock pawls.

However, in the webbing take-up device disclosed in JP-A-2007-84042, the spring is largely curved when the spring is assembled into the spring accommodating hole, thus it is difficult to assemble the spring. In a case where the spring is largely curved in a state where the spring is assembled into the spring accommodating hole, an urging force of the spring is not sufficiently exerted, consequently it is required to adjust the urging force of the spring so that the circular plate is smoothly rotated relatively to the second lock base.

SUMMARY

Embodiments of the present invention has been made in terms of the above-mentioned problems, and provides a webbing take-up device in which a satisfactory assembly property of the coil spring can be obtained and a clutch guide can be smoothly rotated by the coil spring relatively to the clutch cover.

A webbing take-up device according to the first aspect of the embodiments includes: a spool that takes up a webbing belt; a lock member that is arranged coaxially with the spool, and that is fixed to the spool so as to be rotatable integrally with the spool; a clutch cover that is arranged coaxially with the lock member, and that is fixed to the lock member so as to be rotatable integrally with the lock member; a clutch guide that is arranged in an axial direction of the lock member so as to face the clutch cover, and that is supported so as to be rotatable relatively to the lock member; a coil spring provided in a compressed state between a first locking section provided at the clutch guide and a second locking section provided at the clutch cover, and that urges the clutch guide in a rotational direction with respect to the clutch cover; a support section that is formed at the clutch guide, and that supports one axial-direction end section of the coil spring from a side opposite to the clutch cover in an axial direction of the clutch guide; and a shape-regulating section that is projected with respect to the second locking section so as to be inserted into the other axial-direction end section of the coil spring, and that is inclined toward a support section side with respect to a direction orthogonal to an axial direction of the clutch cover, the coil spring being curved so as to be convex to the support section side.

According to the webbing take-up device, the coil spring is assembled to the clutch cover and the clutch guide, for example, by the following procedure. Specifically, first, the second locking section is secured to the other end axial-direction section of the coil spring, and the shape-regulating section projected with respect to the second locking section is inserted into the other end axial-direction section of the coil spring. In this manner, the coil spring is temporarily assembled to the clutch cover.

Next, in this state, the clutch cover is brought close relatively to the clutch guide so that the one end axial-direction section of the coil spring is brought into contact with the support section.

Then, the clutch cover is rotated relatively to the clutch guide so that the one end axial-direction section of the coil spring is brought close to the first locking section while being held in sliding contact with the support section. As a result, the one end axial-direction section of the coil spring is secured to the first locking section. By this procedure, the coil spring is assembled to the clutch cover and the clutch guide.

The above-mentioned shape-regulating section is inclined, with respect to the direction orthogonal to the axial direction of the clutch cover, toward the support section side. Accordingly, as described above, when the clutch cover is rotated relatively to the clutch guide so that the one end axial-direction section of the coil spring is brought close to the first locking section while being held in sliding contact with the support section, the coil spring is curved so as to be convex to the support section side.

Thereby, the coil spring can be suppressed from being largely curved so as to be convex to a side opposite to the support section, that is, to the clutch cover side. Thus, a satisfactory assembly property of the coil spring can be obtained.

In addition, as described above, the shape-regulating section is inclined, with respect to the direction orthogonal to the axial direction of the clutch cover, toward the support section side. Thus, even in a state where the coil spring is assembled to the clutch cover and the clutch guide, the coil spring is maintained in a state where the coil spring is curved to be convex to the support section side.

Accordingly, even when the clutch guide is rotated by the coil spring relatively to the clutch cover, the coil spring can be suppressed from being largely curved so as to be convex to the side opposite to the support section, that is, to the clutch cover side. Thus, hooking of the coil spring to a part of the clutch cover can be suppressed during the actuation of the coil spring. As a result, the urging force of the coil spring can be sufficiently exerted, and hence, the clutch guide can be smoothly rotated by the coil spring relatively to the clutch cover.

The webbing take-up device according to the second aspect of embodiments of the present invention is configured such that, in the webbing take-up device according to the first aspect of the embodiments of the present invention, a contact surface on the second locking section that contacts the coil spring faces a direction to which the shape-regulating section is projected.

According to such a webbing take-up device, the contact surface on the second locking section that contacts the coil spring faces the direction to which the shape-regulating section is projected. Accordingly, for example, in comparison with a case where the contact surface on the second locking section that contacts the coil spring extends along the axial direction of the clutch cover, the coil spring can be curved so as to be more convex to the support section side.

The webbing take-up device according to the third aspect of embodiments of the present invention is configured such that, in the webbing take-up device according to the first aspect of the embodiments of the present invention, the clutch cover has a body section that faces the clutch guide in the axial direction of the clutch guide, and a bend piece that extends from the body section and that is bent so that the bend piece is along the axial direction of the clutch cover, the shape-regulating section is formed in a tongue-like shape of which a thickness direction is a radial direction of the clutch cover and which extends from the bend piece along a rotational direction of the clutch cover, and the second locking section is formed by regions that are a part of the bend piece and are located at both sides of the shape-regulating section in the axial direction of the clutch cover.

According to such a webbing take-up device, the second locking section is formed by regions located at both sides of the shape-regulating section in the axial direction of the clutch cover. Accordingly, it is possible to support the other axial end section of the coil spring at two regions of the second locking section which are separated in the axial direction of the clutch cover. Thereby, the coil spring can be curved so as to be more convex to the support section side.

The webbing take-up device according to the fourth aspect of embodiments of the present invention is configured such that, in the webbing take-up device according to the third aspect of the embodiments of the present invention, one region of the second locking section located on a proximal end section side of the bend piece is located on a leading end section side of the shape-regulating section with respect to the other region of the second locking section located on a leading end section side of the bend piece.

According to such a webbing take-up device, one region of the second locking section located on the proximal end section side of the bend piece is located on the leading end section side of the shape-regulating section with respect to the other region of the second locking section located on the leading end section side of the bend piece. Accordingly, it is possible to further incline the coil spring, that is to be locked at the second locking section, toward the support section side with respect to the direction orthogonal to the axial direction of the clutch cover. Thereby, the coil spring can be curved so as to be more convex to the support section side.

The webbing take-up device according to the fifth aspect of embodiments of the present invention is configured such that, in the webbing take-up device according to the first aspect of the embodiments of the present invention, the shape-regulating section is provided with a wide section, that is formed on a proximal end section side of the shape-regulating section to be wider than a leading end section of the shape-regulating section and that is fitted with the other axial-direction end section of the coil spring by being inserted into the other axial-direction end section of the coil spring.

According to the webbing take-up device, the shape-regulating section is provided with the wide section, that is formed on the proximal end section side of the shape-regulating section to be wider than the leading end section of the shape-regulating section, and the wide section is fitted with the other axial-direction end section of the coil spring by being inserted into the other axial-direction end section of the coil spring. Accordingly, since it is possible to keep the coil spring held on the shape-regulating section when assembling the clutch cover and the clutch guide, it is possible to improve workability during the assembling.

BRIEF DESCRIPTION OF THE DRAWINGS

Exemplary embodiments of the present invention will be described in detail with reference to the following figures, wherein.

DETAILED DESCRIPTION

In the following, description is made of embodiments of the present invention with reference to figures.

Figure 1:
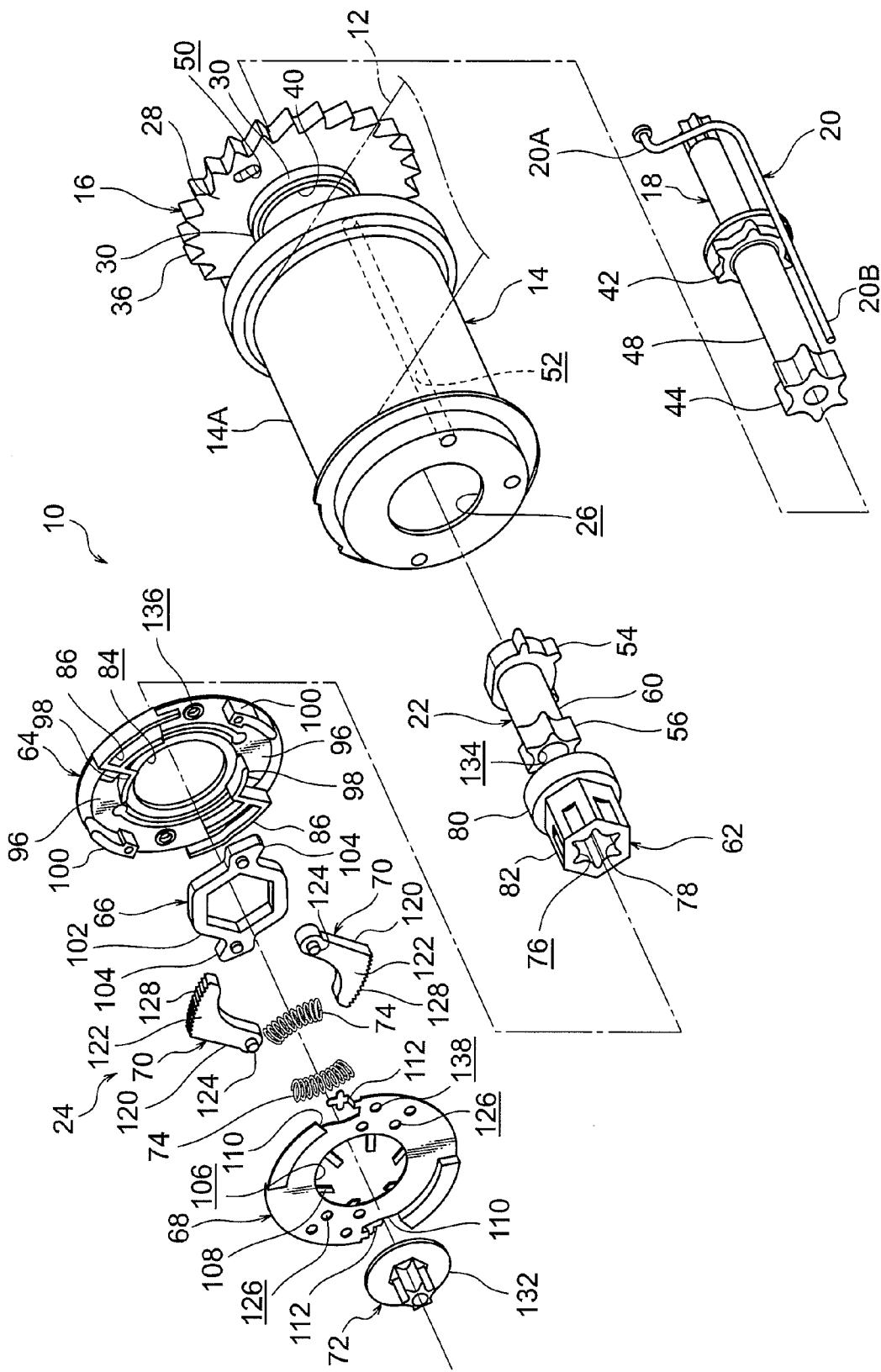
FIG. 1 is an exploded perspective view of a webbing take-up device according to an embodiment of the present invention.

As illustrated in FIG. 1, a webbing take-up device 10 according to an embodiment of the present invention includes a webbing belt 12, a spool 14, a lock gear 16, a main torsion shaft 18, a trigger wire 20, a sub-torsion shaft 22, and a clutch mechanism 24.

The webbing belt 12 is fitted to an occupant's body, and a proximal end section thereof is secured to the spool 14. The spool 14 is formed in such a cylindrical shape as to include a through-hole 26 passing therethrough in an axial direction. When the spool 14 is rotated in a take-up direction as one rotational direction, the spool 14 takes up the webbing belt 12 around an outer peripheral section 14A.

Figure 3:
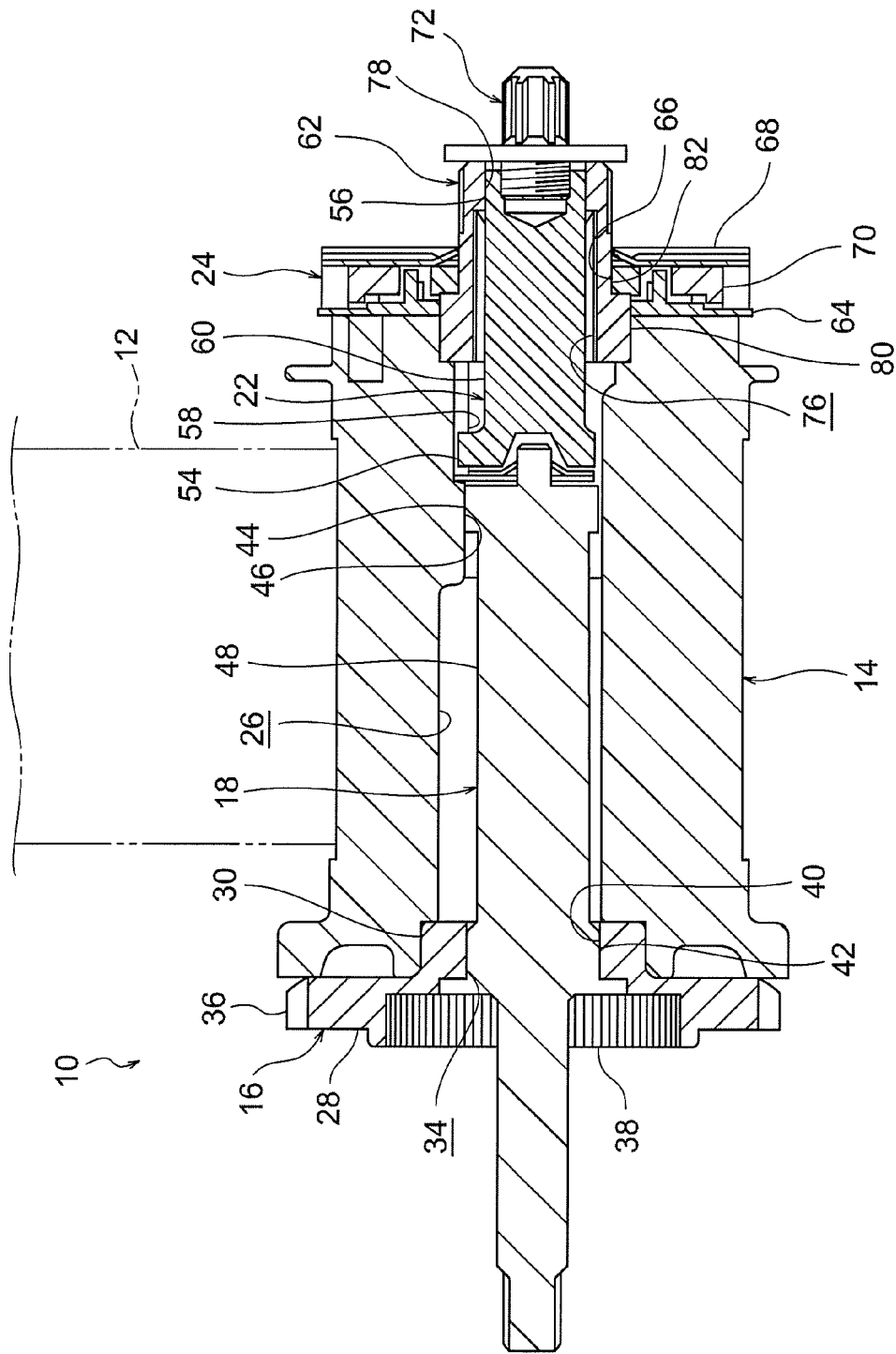
FIG. 3 is a side sectional view of the webbing take-up device illustrated in FIG. 1.

The lock gear 16 is arranged coaxially with the spool 14 on one axial-direction side of the spool 14, and includes a gear body 28 and a projecting section 30 projecting from the gear body 28 to an inside of the spool 14. As illustrated in FIG. 3, the gear body 28 and the projecting section 30 are provided with a through-hole 34 passing therethrough in the axial direction. Further, the gear body 28 is provided with a gear section 36 formed at an outer peripheral section thereof and a knurled engagement-subject section 38 formed at an inner peripheral section thereof. Meanwhile, a spline engagement-subject section 40 is formed at an inner peripheral section of the projecting section 30.

The main torsion shaft 18 is arranged coaxially with the spool 14 and the lock gear 16, and inserted in the through-hole 26 of the spool 14 and the through-hole 34 of the lock gear 16. A first engagement section 42 formed in a spline shape is provided with a longitudinal-direction intermediate section of the main torsion shaft 18, and a second spline engagement section 44 also formed in a spline shape is provided with a leading end section thereof.

The first engagement section 42 is engaged with the engagement subject section 40 of the lock gear 16, and hence, the main torsion shaft 18 is fixed to the lock gear 16 so as to be rotatable integrally therewith. Further, the second engagement section 44 is engaged with an engagement subject section 46 formed at an inner peripheral section of the spool 14, and hence, the main torsion shaft 18 is fixed to the spool 14 so as to be rotatable integrally therewith.

A part between the first engagement section 42 and the second engagement section 44 in the main torsion shaft 18 is formed, as described below, as a first energy-absorbing section 48 for absorbing energy for pulling of the webbing belt 12.

As illustrated in FIG. 1, the trigger wire 20 is extended along the main torsion shaft 18. A proximal end section 20A of the trigger wire 20 is inserted in a hole section 50 formed at a position on a radially outer side relative to an axial center section of the gear body 28, and is fixed to the gear body 28. Meanwhile, a leading end side relative to the proximal end section 20A of the trigger wire 20 is inserted in a hole section 52 formed at the spool 14 in parallel to the through-hole 26. A leading end section 20B of the trigger wire 20 is projected from the spool 14 to the other axial-direction side.

The sub-torsion shaft 22 is arranged coaxially with the main torsion shaft 18, and a proximal end side relative to a longitudinal-direction intermediate section of the sub-torsion shaft 22 is inserted in the through-hole 26 of the spool 14. Meanwhile, a leading end side relative to the longitudinal-direction intermediate section of the sub-torsion shaft 22 is projected from the spool 14 to the other axial-direction side.

The sub-torsion shaft 22 is provided with a first engagement section 54 including plural protrusions at a proximal end section thereof, and a second engagement section 56 formed in a spline shape at a leading end section thereof. The first engagement section 54 is engaged with an engagement subject section 58 (refer to FIG. 3) formed at an inner peripheral section of the spool 14. Thereby, the sub-torsion shaft 22 is fixed to the spool 14 so as to be rotatable integrally therewith.

A part between the first engagement section 54 and the second engagement section 56 in the sub-torsion shaft 22 is formed, as described below, as a second energy-absorbing section 60 for absorbing energy for pulling of the webbing belt 12.

Figure 2:
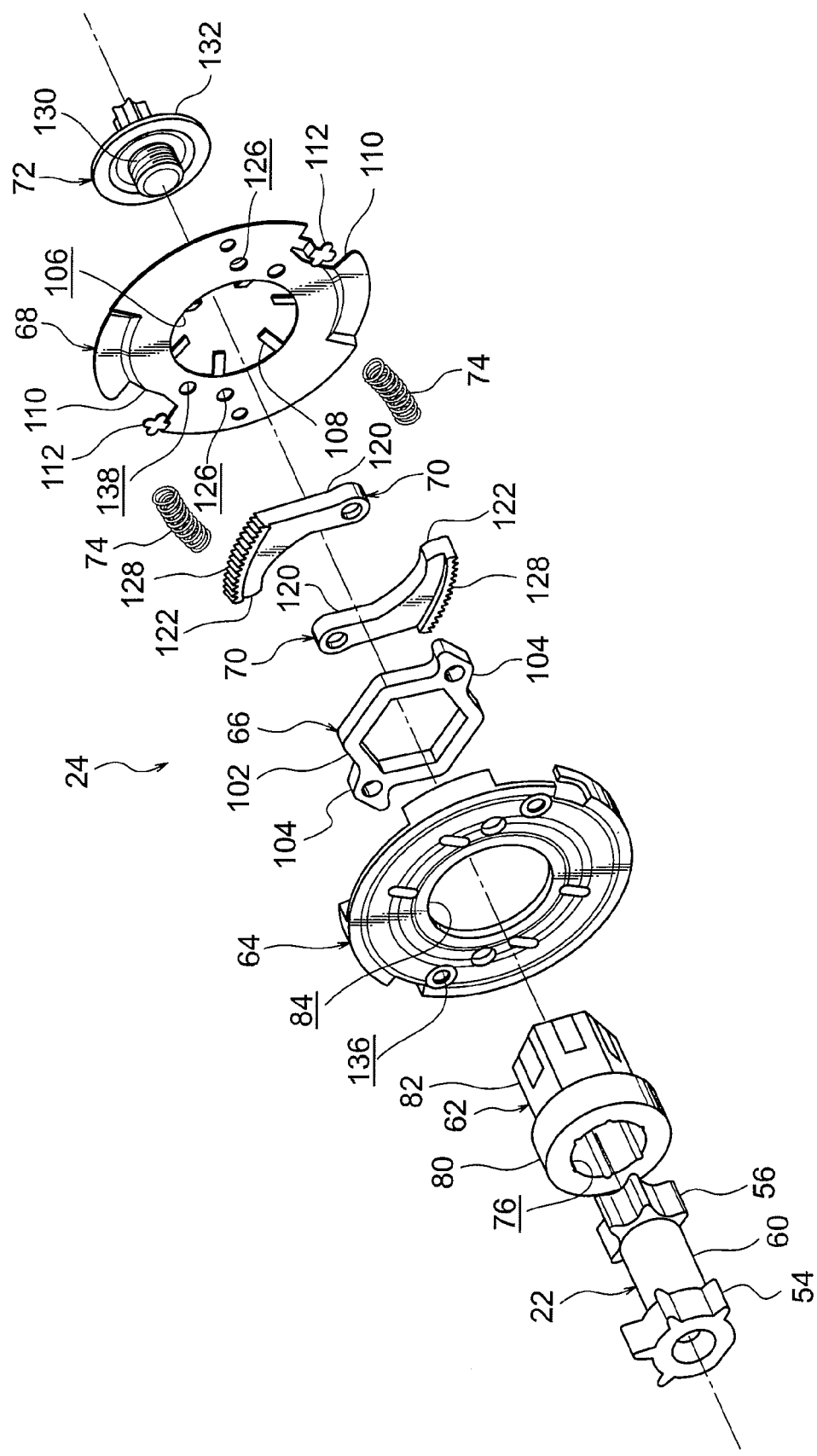
FIG. 2 is an exploded perspective view in which a clutch mechanism illustrated in FIG. 1 is viewed in a direction opposite to that in FIG. 1.

As illustrated in FIGS. 1 and 2, the clutch mechanism 24 includes a sleeve 62, a clutch guide 64, a clutch base 66, a clutch cover 68, a pair of clutch plates 70, a screw 72, and a pair of coil springs 74. Note that, in this embodiment, the sub-torsion shaft 22, the sleeve 62, and the clutch base 66 constitute a lock member of the present invention.

The sleeve 62 is arranged coaxially with the sub-torsion shaft 22. A through-hole 76 passing therethrough in the axial direction is formed at an axial center section of the sleeve 62. The above-mentioned sub-torsion shaft 22 is loosely inserted in the through-hole 76. Further, an engagement-subject section 78 formed in a spline shape (refer to FIGS. 1 and 3) is provided with a leading end side in an inner peripheral section of the sleeve 62. The second engagement section 56 is engaged with the engagement subject section 78, and hence, the sleeve 62 is fixed to the sub-torsion shaft 22 so as to be rotatable integrally therewith.

Further, a proximal end side of the sleeve 62 is formed as a rotation support section 80 having a circular outer shape. A leading end side relative to the rotation support section 80 in the sleeve 62 is formed as a fitting section 82 having a hexagonal outer shape.

The clutch guide 64 is a resin-molded product, and formed in such an annular shape as to have a through-hole 84 passing therethrough in the axial direction. The above-mentioned rotation support section 80 is inserted in the through-hole 84. Thereby, the clutch guide 64 is supported so as to be rotatable relatively to the sleeve 62, by extension, to the sub-torsion shaft 22.

Figure 4:
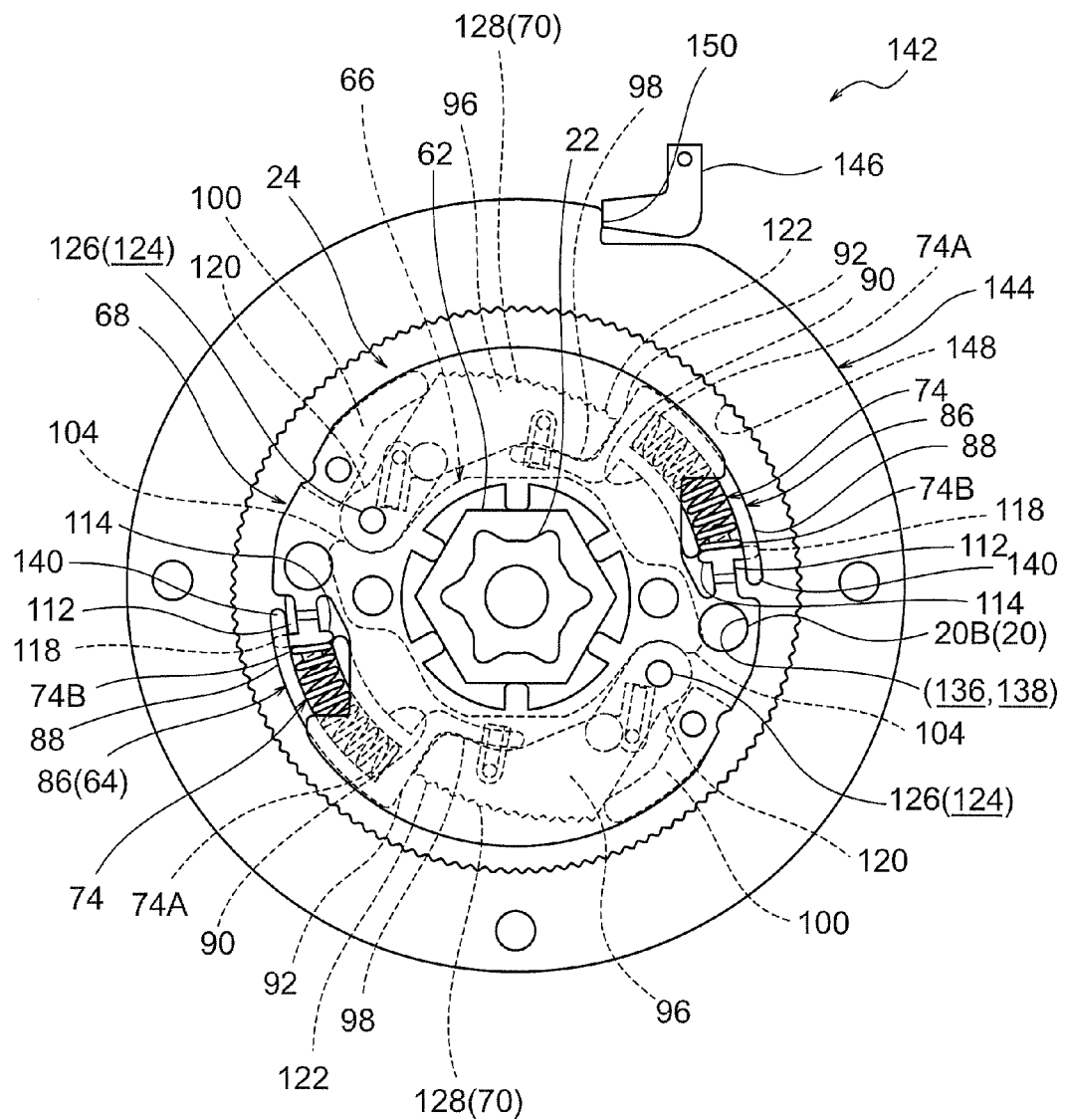
FIG. 4 is a front view of the clutch mechanism illustrated in FIG. 1.

As illustrated in FIG. 4, coil-spring accommodating sections 86 for respectively accommodating the coil springs 74 are formed respectively at two points of the clutch guide 64 in a circumferential direction thereof. The pair of coil-spring accommodating sections 86 are formed so as to be point-symmetrical with each other with respect to a central section of the clutch guide 64. Each of the coil-spring accommodating sections 86 has such a substantially C-shape as to have an outer-side wall section 88 and an inner-side wall section 90 which extend in the circumferential direction of the clutch guide 64, and a coupling wall section 92 as a first locking section which extends in a radial direction of the clutch guide 64 and couples respective end sections of the outer-side wall section 88 and the inner-side wall section 90.

Figure 8:
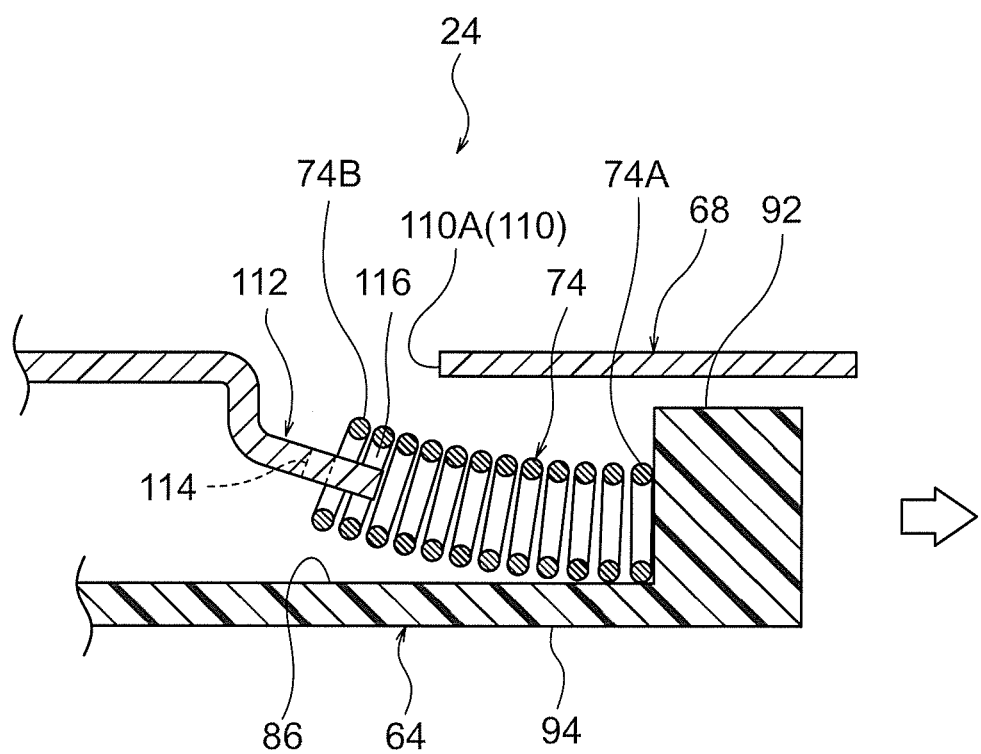
FIG. 8 is a sectional view taken along the line 8-8 of FIG. 4.

Further, as illustrated in FIG. 8, the coil-spring accommodating section 86 is opened to a clutch-cover 68 side, and a side thereof opposite to the clutch cover 68 is, as described below, formed as a support section 94 for supporting one axial-direction end section 74A of each of the coil springs 74 from a side opposite to the clutch cover 68 in the axial direction of the clutch guide 64.

Further, as illustrated in FIG. 4, the clutch guide 64 is provided with clutch-plate accommodating sections 96, which are formed adjacent to the coil-spring accommodating sections 86, for respectively accommodating the clutch plates 70. Each of the clutch-plate accommodating sections 96 is provided with a first support-wall section 98 formed to extend from the coupling wall section 92 to a side opposite to the inner-side wall section 90, and a second support-wall section 100 formed at a side opposite to the outer-side wall section 88 across the coupling wall section 92 while being separated from the coupling wall section 92.

As illustrated in FIGS. 1 and 2, the clutch base 66 includes an annular fitting-subject section 102 having a hexagonal shape. The fitting section 82 is fitted (press-fitted) to an inside of the fitting subject section 102, and hence, the clutch base 66 is fixed to the sleeve 62 so as to be rotatable integrally therewith. Further, the clutch base 66 is provided with locking sections 104 projecting from the fitting subject section 102 to an outer side. The locking sections 104 are secured respectively to proximal end sections of arm sections 120 (described later) provided at the clutch plates 70 (refer to FIG. 4).

The clutch cover 68 is arranged coaxially with the sleeve 62, and arranged on a side opposite to the spool 14 across the clutch guide 64 so as to face the clutch guide 64. The clutch cover 68 is formed in such an annular shape as to include a through-hole 106 passing therethrough in the axial direction, and has an inner peripheral section provided with plural fitting claws 108 projecting toward a radial-direction inner side. The above-mentioned fitting section 82 is inserted in the through-hole 106. The plural fitting claws 108 are fitted to the fitting section 82, and hence, the clutch cover 68 is fixed to the sleeve 62 and, by extension, to the sub-torsion shaft 22 so as to be rotatable integrally therewith.

Further, cutout sections 110 each having such a recessed shape in axial-direction view as to open to a radial-direction outer side are formed respectively at the two points of the clutch cover 68 in the circumferential direction thereof. In addition, the clutch cover 68 is provided with cross claws 112 so as to be positioned in the respective cutout sections 110. The pair of cross claws 112 and the pair of cutout sections 110 are formed to be point-symmetrical with each other with respect to a central section of the clutch cover 68.

Figure 7:
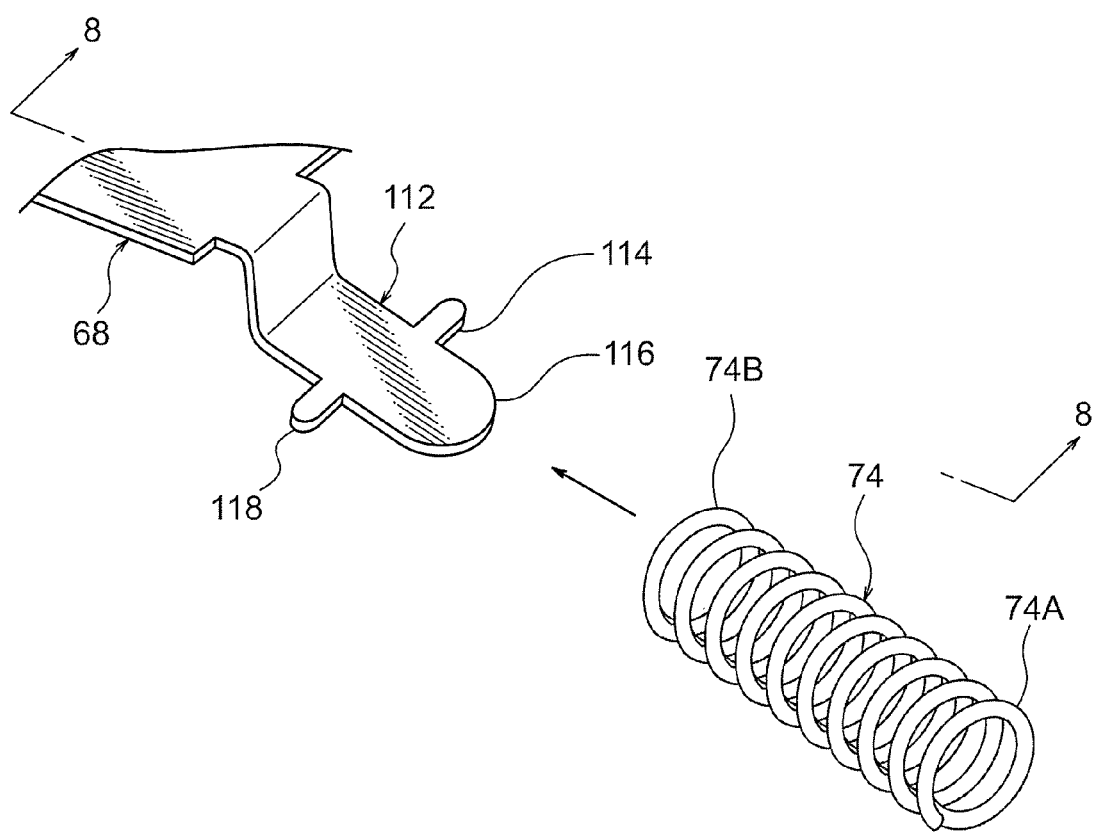
FIG. 7 is a main-part exploded perspective view of a cross claw and a coil spring which are illustrated in FIG. 4.

Still further, as illustrated in FIG. 7, each of the cross claws 112 is formed in such a cross shape as to have: an inner-side locking section 114 extending to the radial-direction inner side of the clutch cover 68 and serving as a second locking section; a leading-end protruding section 116 projected with respect to the inner-side locking section 114, extending in a tangential direction with respect to the clutch cover 68, and serving as a shape-regulating section; and an outer-side locking section 118 extending to a side opposite to the inner-side locking section 114. As illustrated in FIG. 8, the leading-end protruding section 116 is inclined, with respect to a direction orthogonal to an axial direction of the clutch cover 68, toward a support section 94 side.

As illustrated in FIGS. 1 and 2, the clutch plates 70 are arranged between the clutch cover 68 and the clutch guide 64. Each of the clutch plates 70 includes the arm section 120 and a circular-arc section 122 formed at a leading end section of the arm section 120.

A turning shaft 124 (refer to FIG. 1) projecting toward the clutch-cover 68 side and extending along an axial direction of the clutch cover 68 is formed at a proximal end section of the arm section 120. The turning shaft 124 is inserted in a hole section 126 formed at the clutch cover 68, and hence, the clutch plates 70 are turnably supported by the clutch cover 68. Further, a knurled engagement section 128 is formed at an outer peripheral section of the circular-arc section 122.

As illustrated in FIG. 2, the screw 72 includes a threaded section 130 and a pressing section 132 larger in diameter than the threaded section 130. The threaded section 130 is threadedly engaged with a threaded hole 134 formed at a leading end section of the sub-torsion shaft 22. Thereby, the screw 72 is fixed to the leading end section of the sub-torsion shaft 22. Further, in this manner, in a state where the screw 72 is fixed to the leading end section of the sub-torsion shaft 22, the pressing section 132 is held in contact with the leading end section of the sleeve 62. Thereby, movement of the sleeve 62 in a disengaging direction with respect to the sub-torsion shaft 22 is regulated.

Further, as illustrated in FIG. 1, the above-mentioned clutch guide 64 and the clutch cover 68 are respectively provided with hole sections 136 and 138. The leading end section 20B of the trigger wire 20 is inserted in both the hole sections 136 and 138, and hence, rotation of the clutch guide 64 is regulated with respect to the clutch cover 68.

Further, in a state where the rotation of the clutch guide 64 is regulated with respect to the clutch cover 68 as just described above, as illustrated in FIG. 4, the cross claw 112 is positioned near an opening section in the coil-spring accommodating section 86 formed in the substantially C-shape. The other axial-direction end section 74b of the coil spring 74 accommodated in the coil-spring accommodating section 86 is secured to the inner-side locking section 114 of the cross claw 112, and the one axial-direction end section 74A of the coil spring 74 is secured to the coupling wall section 92.

Note that, the outer-side locking section 118 is secured to a locking section 140 extending from the outer-side wall section 88 along the circumferential direction of the clutch cover 68 so as to be movable in the circumferential direction of the clutch cover 68 and immovable in the axial direction thereof.

Further, in this state, an interval between the cross claw 112 and the coupling wall section 92 is shorter than the entire length of the coil spring 74 in a free state, and hence, the coil spring 74 is held in a compressed state. As a result, with respect to the clutch guide 64, an urging force is applied in one rotational direction. Further, as illustrated in FIG. 7, the above-mentioned leading-end protruding section 116 is inserted in the other axial-direction end section 74b of the coil spring 74. Thereby, as illustrated in FIG. 8, the coil spring 74 is curved so as to be convex to the support section 94 side.

Meanwhile, in this state, as illustrated in FIG. 4, an interval between the hole section 126 of the clutch cover 68 (turning shaft 124 of the clutch plate 70) and the coupling wall section 92 is sufficiently secured. The clutch plate 70 is accommodated in the clutch-plate accommodating section 96 so that the engagement section 128 is housed on an inner side relative to an outer shape section of the clutch guide 64. Further, in this state, the coupling wall section 92 is held in contact with a leading end section of the circular-arc section 122.

In addition, as illustrated in FIG. 4, the webbing take-up device 10 includes a switching mechanism 142 in addition to the above-mentioned components. The switching mechanism 142 includes a lock ring 144, an engagement member 146, and a gas generator (not shown). The lock ring 144 is formed in an annular shape around the clutch guide 64 and the clutch cover 68, and a knurled engagement-subject section 148 engageable with the above-mentioned engagement sections is formed at an inner peripheral section of the lock ring 144.

The engagement member 146 is engaged with an engagement section 150 formed at an outer peripheral section of the lock ring 144. When being activated by receiving an activation signal from an ECU (not shown), the gas generator turns the engagement member 146 so as to release an engaged state of the engagement member 146 and the engagement section of the lock ring 144.

In this webbing take-up device 10, the following operation is performed.

Specifically, in a state where the webbing belt 12 drawn out of the spool 14 illustrated in FIG. 1 is fitted to an occupant's body, when, for example, a vehicle is abruptly decelerated and a lock mechanism (not shown) is actuated, an engagement member (not shown) provided at the lock mechanism is engaged with the engagement subject section 38 (refer to FIG. 3) of the lock gear 16 so that rotation of the lock gear 16 is regulated.

Thereby, a rotation of the spool 14 coupled to the lock gear 16 via the main torsion shaft 18 in the drawing-out direction is regulated, and hence, drawing-out of the webbing belt 12 from the spool 14 is regulated. Accordingly, the occupant's body to move forward is restrained by the webbing belt 12.

Further, in a state where the rotation of the lock gear 16 is regulated, when the webbing belt 12 is pulled with a higher force by the occupant's body and when a rotational force, which derives from this pulling force, of the spool 14 in the drawing-out direction exceeds mechanical strength of the first energy-absorbing section 48, the first energy-absorbing section 48 is subjected to torsion. As a result, the spool 14 is rotated in the drawing-out direction by this torsional amount.

Accordingly, the webbing belt 12 is drawn out of the spool 14 by a rotation amount into the drawing-out direction of the spool 14. Thereby, a load (burden) from the webbing belt 12 onto a chest of the occupant is alleviated, and energy for pulling of the webbing belt 12 is absorbed by the torsional amount just described above.

Meanwhile, as described above, the rotation of the spool 14 in the drawing-out direction with respect to the lock gear 16 means relative rotation of the lock gear 16 in the take-up direction with respect to the spool 14. Accordingly, when the lock gear 16 is rotated relatively to the spool 14 in the take-up direction, the proximal end section 20A of the trigger wire 20 is moved in the circumferential direction of the main torsion shaft 18 in accordance therewith, with the leading end side relative to the proximal end section 20A of the trigger wire 20 being inserted in the hole section 52. Thus, the leading end side relative to the proximal end section 20A of the trigger wire 20 is pulled to the lock gear 16 side with respect to the hole section 52.

In this manner, the leading end section 20B of the trigger wire 20 is pulled out of the hole section 136 of the clutch cover 68 and the hole section 138 of the clutch guide 64. As a result, a state is released in which the rotation of the clutch guide 64 is regulated with respect to the clutch cover 68.

Figure 5:
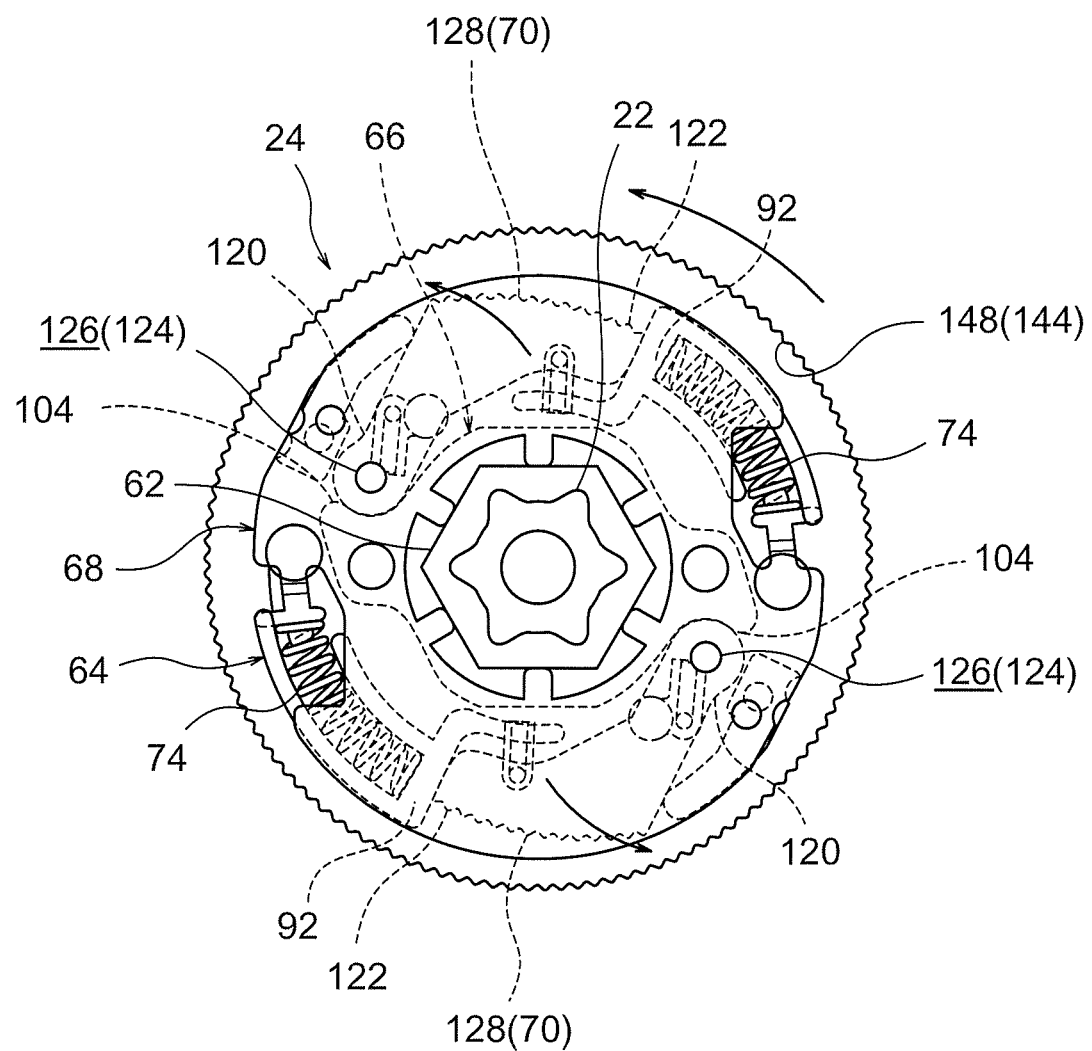
FIG. 5 is an explanatory view of an operation of the clutch mechanism illustrated in FIG. 4, illustrating a state in which a clutch plate has not yet been engaged with a lock ring.

When the urging force of the coil spring 74 causes the clutch guide 64 to be rotated relatively to the clutch cover 68 in the one rotational direction, as illustrated in FIG. 5, the interval between the hole section 126 of the clutch cover 68 (turning shaft 124 of the clutch plates 70) and the coupling wall section 92 is reduced. Thus, the leading end section of the circular-arc section 122 is pressed (guided) by the coupling wall section 92 in a tangential direction with respect to the clutch guide 64. In this manner, the clutch plates 70 are turned to a lock ring 144 side.

Figure 6:
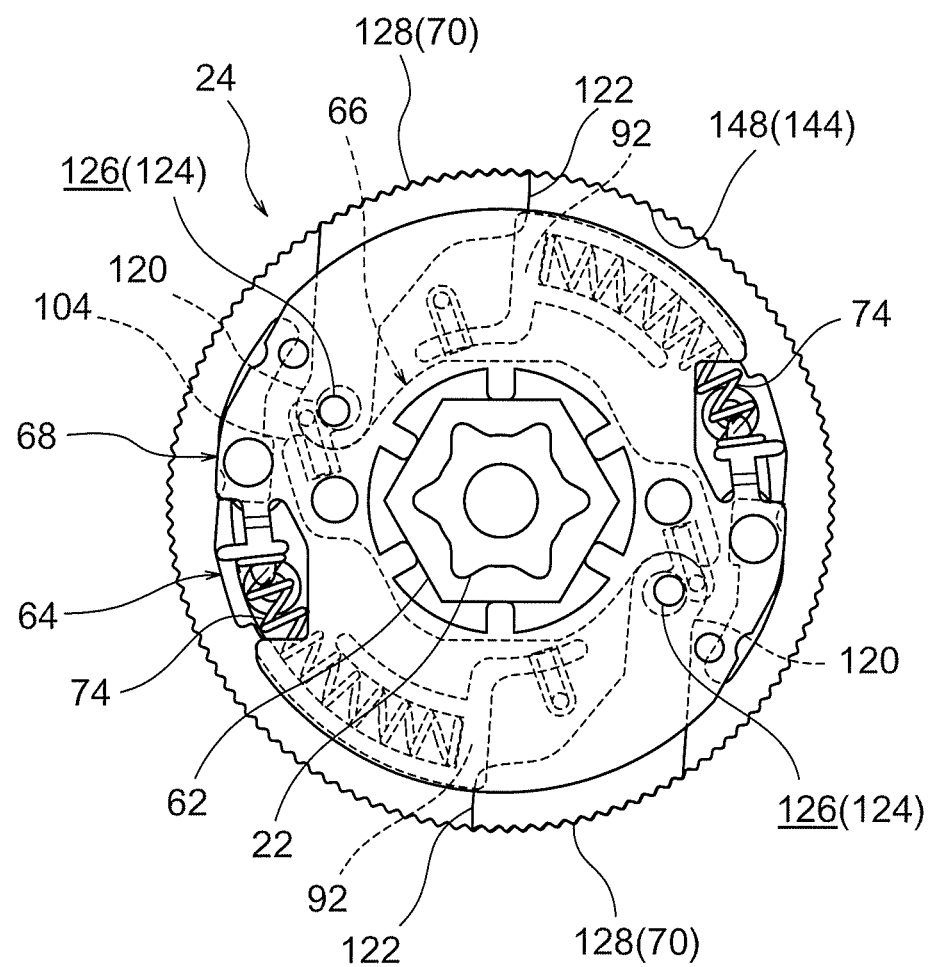
FIG. 6 is an explanatory view of the operation of the clutch mechanism illustrated in FIG. 4, illustrating a state in which the clutch plate has been engaged with the lock ring.

Further, as illustrated in FIG. 6, when the clutch guide 64 is rotated relatively to the clutch cover 68 at a predetermined rotational angle in the one rotational direction, the engagement section 128 of the clutch plate 70 is engaged with the engagement-subject section 148 of the lock ring 144. Further, at this time, the locking section 104 provided at the clutch base 66 is maintained in such a state as to be secured to the proximal end section of the arm section 120. Accordingly, rotation of the clutch base 66 with respect to the lock ring 144 and, by extension, rotation of the sleeve 62 is regulated.

Further, in a state where the rotation of the sleeve 62 is regulated, when the webbing belt 12 illustrated in FIG. 1 is pulled with a higher force by the occupant's body and when the rotational force, which derives from this pulling force, of the spool 14 in the drawing-out direction exceeds mechanical strength of the second energy-absorbing section 60, the second energy-absorbing section 60 is subjected to torsion. As a result, the spool 14 is rotated in the drawing-out direction by this torsional amount.

Accordingly, the webbing belt 12 is drawn out of the spool 14 by a rotation amount in the drawing-out direction of the spool 14. Thereby, a load (burden) from the webbing belt 12 onto a chest of the occupant is alleviated, and energy for pulling of the webbing belt 12 is absorbed by the torsional amount just described above.

Meanwhile, prior to actuation of the above-mentioned lock mechanism (not shown), when the ECU determines that the body size of the occupant is smaller than a preset reference value based on a signal from a body-size detector (not shown), the gas generator (not shown) is activated by the ECU.

Then, the gas generator thus activated turns the engagement member 146 illustrated in FIG. 4 so as to release the engaged state of the engagement member 146 and the engagement section 150 of the lock ring 144. Accordingly, in this case, when the clutch mechanism 24 is actuated, the rotational force of the spool 14 (refer to FIG. 1) is transmitted to the lock ring 144 via the clutch mechanism 24, and hence, the lock ring 144 is rotated together with the spool 14 in the drawing-out direction. Thus, in this state, although torsion occurs in the first energy-absorbing section 48 illustrated in FIG. 1, torsion does not occur in the second energy-absorbing section 60. Therefore, energy absorption by the second energy-absorbing section 60 does not occur.

In other words, in this webbing take-up device 10, according to body sizes of occupants, a mode in which energy is absorbed by the second energy-absorbing section 60 and another mode in which energy is not absorbed by the second energy-absorbing section 60 can be selectively switched between each other.

Next, description is made of functions and advantages of some embodiments of the present invention together with description of an assembly method for the above-mentioned coil springs 74 to the clutch cover 68 and the clutch guide 64.

Figure 9A:
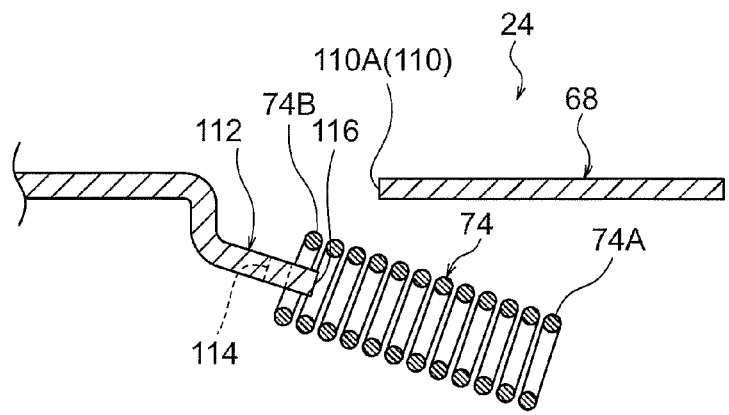
FIG. 9A is a sectional view corresponding to FIG. 8, illustrating an assembly procedure of the coil spring illustrated in FIG. 4 to a clutch cover and a clutch guide.

According to the webbing take-up device 10, the coil springs 74 are assembled to the clutch cover 68 and the clutch guide 64, for example, by the following procedure. Specifically, as illustrated in FIG. 9A, first, the inner-side locking section 114 is secured to the other axial-direction end section 74b of the coil spring 74, and the leading-end protruding section 116 projected with respect to the inner-side locking section 114 is inserted into the other axial-direction end section 74b of the coil spring 74. In this manner, the coil spring 74 is temporarily assembled to the clutch cover 68.

Figure 9B:
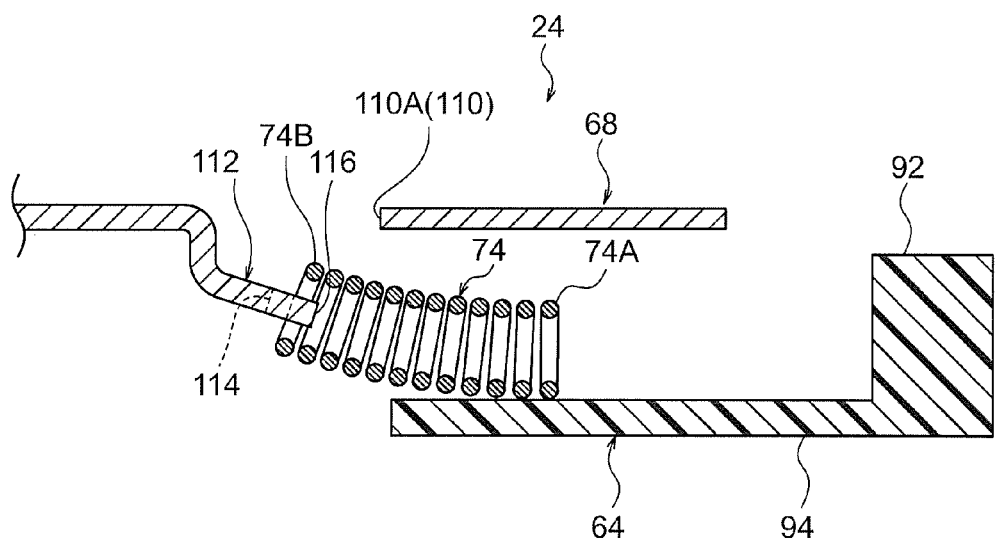
FIG. 9B is another sectional view corresponding to FIG. 8, illustrating the assembly procedure of the coil spring illustrated in FIG. 4 to the clutch cover and the clutch guide.

Next, in this state, as illustrated in FIG. 9B, the clutch cover 68 is brought close relatively to the clutch guide 64 so that the one axial-direction end section 74A of the coil spring 74 is brought into contact with the support section 94.

Figure 9C:
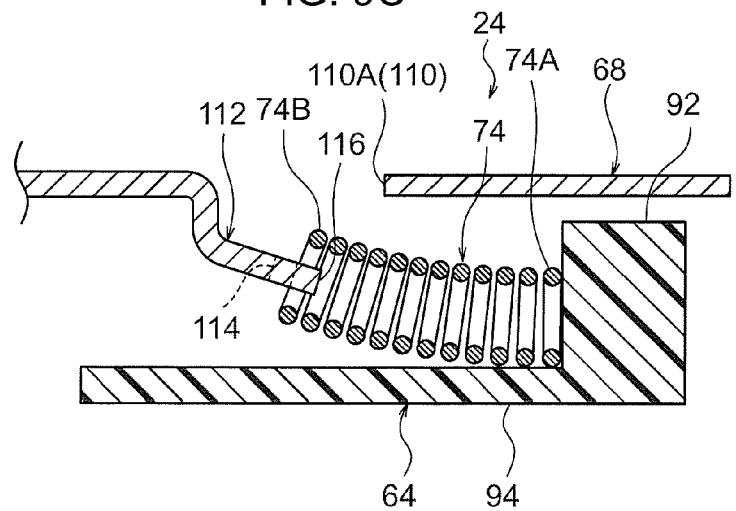
FIG. 9C is still another sectional view corresponding to FIG. 8, illustrating the assembly procedure of the coil spring illustrated in FIG. 4 to the clutch cover and the clutch guide.

Then, as illustrated in FIG. 9C, the clutch cover 68 is rotated relatively to the clutch guide 64 so that the one axial-direction end section 74A of the coil spring 74 is brought close to the coupling wall section 92 while being held in sliding contact with the support section 94. As a result, the one axial-direction end section 74A is secured to the coupling wall section 92. By this procedure, the coil spring 74 is assembled to the clutch cover 68 and the clutch guide 64.

The above-mentioned leading-end protruding section 116 is inclined with respect to the support section 94 side of the clutch cover 68 with respect to the direction orthogonal to the axial direction. Accordingly, as illustrated in FIG. 9B, when the clutch cover 68 is rotated relatively to the clutch guide 64 so that the one axial-direction end section 74A of the coil spring 74 is brought close to the coupling wall section 92 while being held in sliding contact with the support section 94, the coil spring 74 is curved so as to be convex to the support section 94 side.

Thereby, the coil spring 74 can be suppressed from being largely curved so as to be convex to a side opposite to the support section 94, that is, to the clutch-cover 68 side. Thus, a satisfactory assembly property of the coil spring 74 can be obtained. In particular, even when an elastic force of the coil spring 74 is high, the coil spring 74 can be suppressed from being largely curved so as to be convex to the clutch-cover 68 side.

In addition, as described above, the leading-end protruding section 116 is inclined, with respect to the direction orthogonal to the axial direction, toward the support section 94 side of the clutch cover 68. Thus, as illustrated in FIG. 9C, even in a state where the coil spring 74 is assembled to the clutch cover 68 and the clutch guide 64, the coil spring 74 is maintained in such a state as to be curved to be convex to the support section 94 side.

Accordingly, even when the clutch guide 64 is rotated by the coil spring 74 relatively to the clutch cover 68 (refer to FIGS. 4 to 6), the coil spring 74 can be suppressed from being largely curved so as to be convex to the side opposite to the support section 94, that is, to the clutch-cover 68 side. Thus, hooking of the coil spring 74 with respect to an inner rim section 110A of the cutout section 110 can be suppressed during actuation of the coil spring 74. As a result, the urging force of the coil spring 74 can be sufficiently exerted, and hence, the clutch guide 64 can be smoothly rotated by the coil spring 74 relatively to the clutch cover 68.

As described above, according to the embodiments of the present invention, a satisfactory assembly property of the coil spring 74 can be obtained, and the clutch guide 64 can be smoothly rotated by the coil spring 74 relatively to the clutch cover 68.

Further, it is unnecessary to use jigs and the like for assembly of the coil spring 74, and hence, cost reduction can be achieved.

Next, a description is made of modifications of some embodiments of the present invention.

In the above-mentioned embodiment, although the clutch cover 68 includes the cross claws 112 as a structure for holding the other axial-direction end section 74b of the coil spring 74, the following structure may be alternatively employed.

Figure 10:
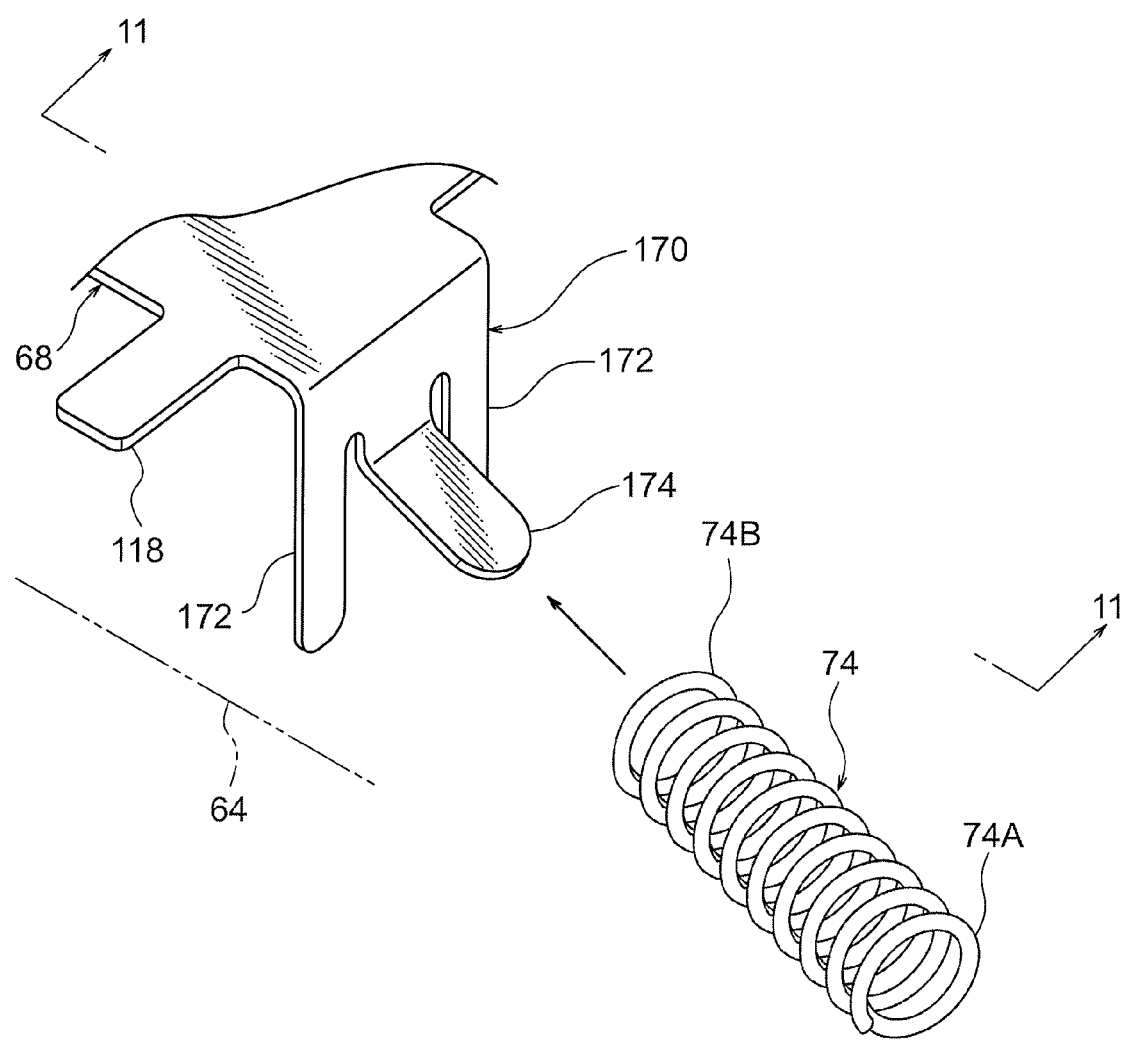
FIG. 10 is a perspective view illustrating a modification of a locking section illustrated in FIG. 7.
Figure 11:
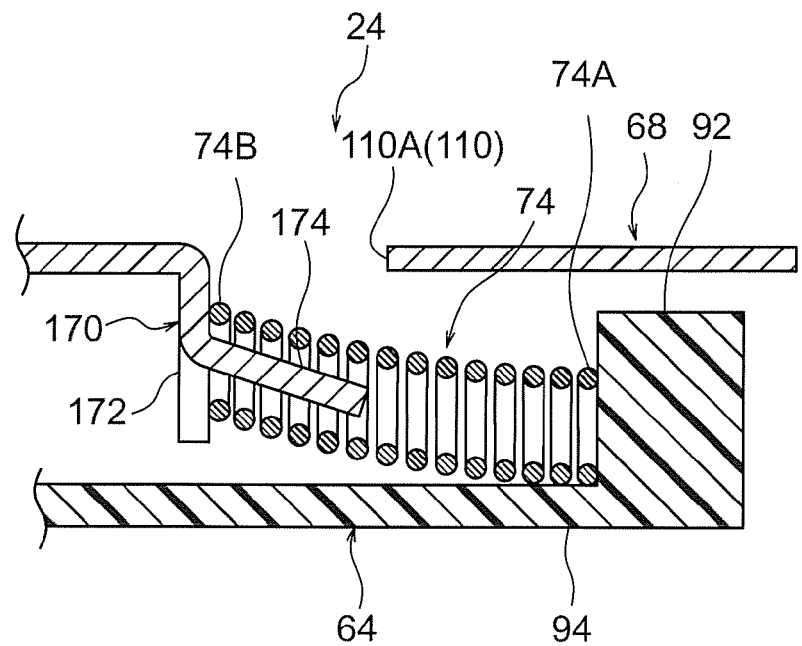
FIG. 11 is a sectional view taken along the line 11-11 of FIG. 10.

Specifically, in a modification illustrated in FIGS. 10 and 11, the clutch cover 68 includes a holding section 170 as a structure for supporting the other axial-direction end section 74b of the coil spring 74. The holding section 170 includes a pair of second locking sections 172 extending from the clutch cover 68 to a clutch-guide 64 side along the axial direction of the clutch cover 68, and a shape-regulating section 174 extending from between the pair of second locking sections 172 in the tangential direction with respect to the clutch cover 68.

As illustrated in FIG. 11, the other axial-direction end section 74b of the coil spring 74 is secured to the pair of second locking sections 172. Further, the shape-regulating section 174 is inclined, with respect to the direction orthogonal to the axial direction, toward the support section 94 side of the clutch cover 68, and inserted in the other axial-direction end section 74b of the coil spring 74.

Also due to this structure, functions and advantages similar to those in the above-mentioned can be obtained.

Figure 12:
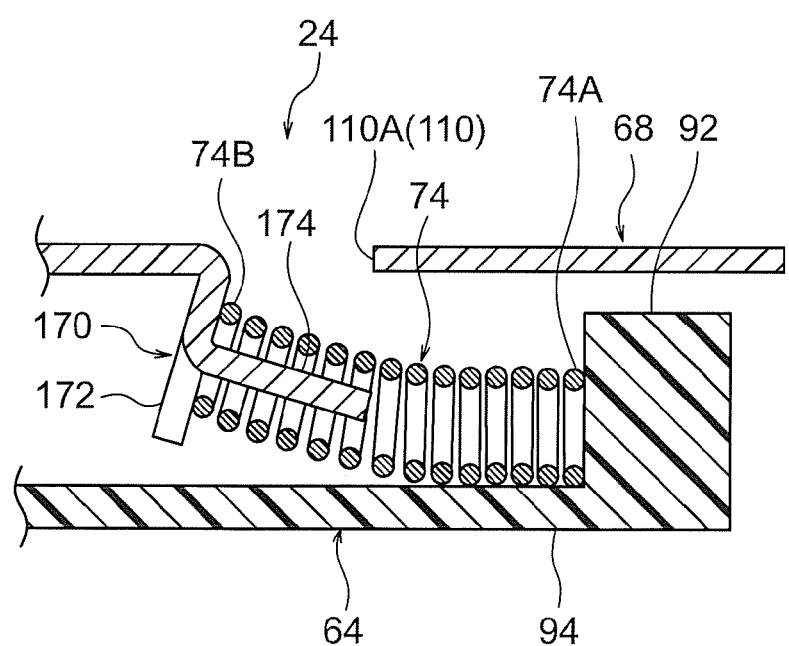
FIG. 12 is a sectional view corresponding to FIG. 11, illustrating another modification of the locking section illustrated in FIG. 7.

Further, in another modification illustrated in FIG. 12, unlike the above-mentioned modification illustrated in FIG. 10 and FIG. 11, the structure is modified as follows. That is, the second locking sections 172 extend to the clutch guide 64 side, and are inclined with respect to the axial direction of the clutch cover 68 so that a contact surface 172A contacting the coil spring 74 faces toward a projecting direction of the shape-regulating section 174 (so that the contact surface is orthogonal to the shape-regulating section 174).

Thus, according to the constitution in which the contact surface 172A on the second locking sections 172 that contacts the coil spring 74 faces toward the projecting direction of the shape-regulating section 174, for example, the coil spring 74 can be curved so as to be more convex to the support section 94 side, in comparison with a case where the contact surface 172A extends along the axial direction of the clutch cover 68 (for example, refer to FIG. 11).

Figure 13:
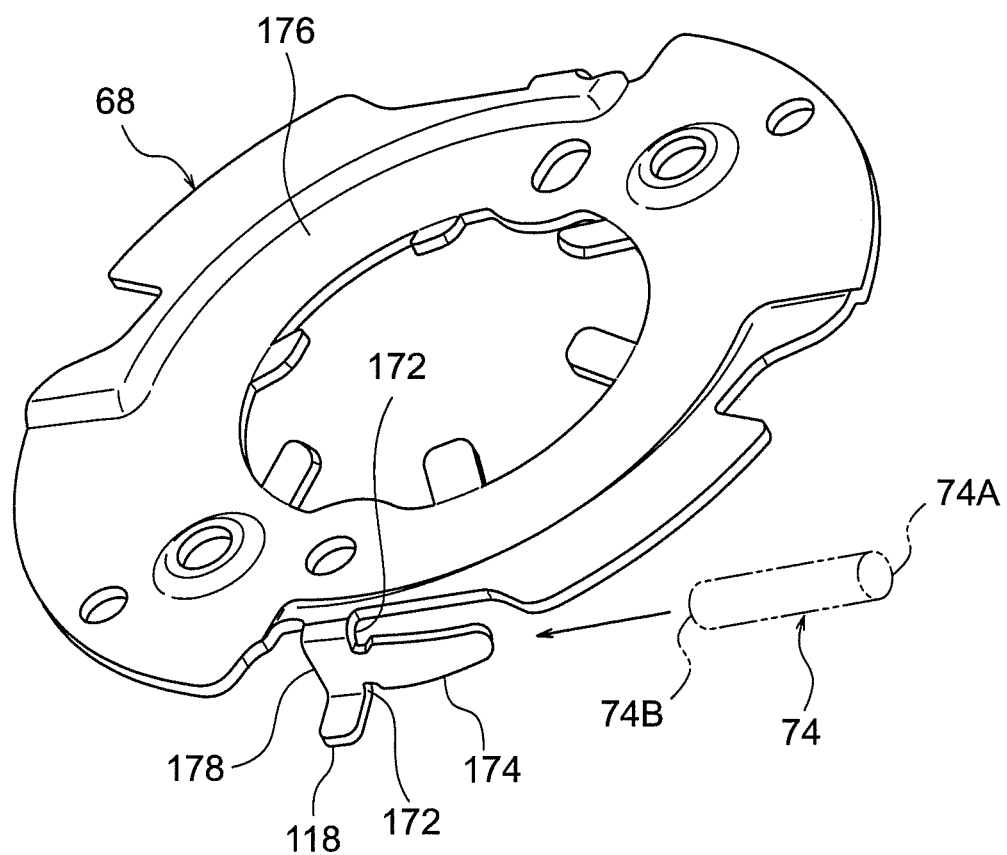
FIG. 13 is a perspective view illustrating a modification of the clutch cover illustrated in FIG. 2.
Figure 14:
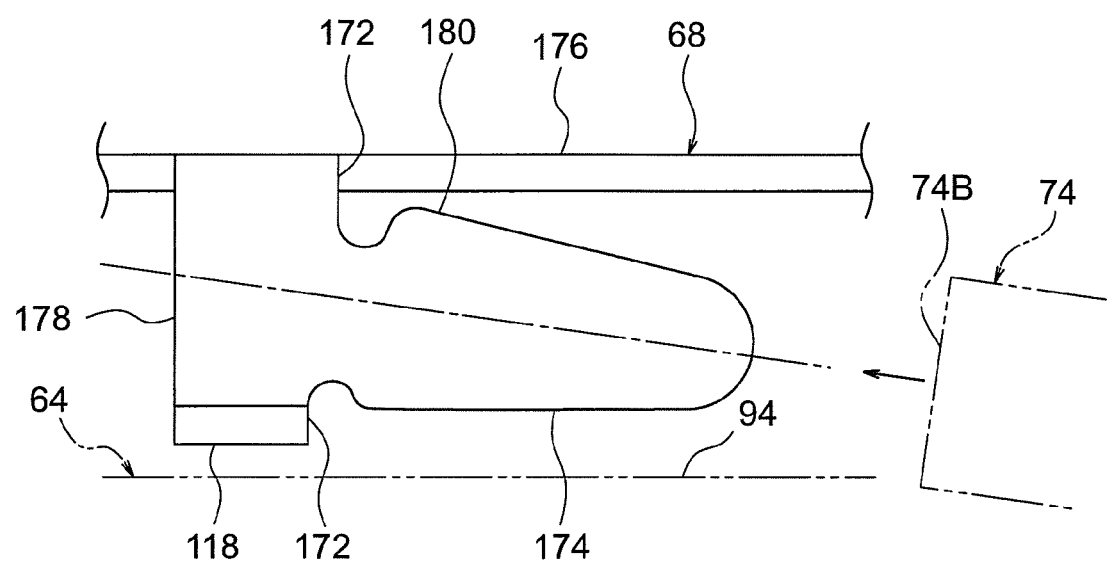
FIG. 14 is a main-part exploded side view of the shape-regulating section illustrated in FIG. 13 and a peripheral section thereof.

Further, in another modification illustrated in FIG. 13 and FIG. 14, unlike the above-mentioned modification illustrated in FIG. 10 and FIG. 11, the structure is modified as follows. That is, as illustrated in FIG. 13, the clutch cover 68 has a body section 176 that faces the above-mentioned clutch guide 64 (refer to FIG. 2) in an axial direction, and a bend piece 178 that extends from the body section 176 and that is bent so that the bend piece is along the axial direction of the clutch cover 68.

Still further, the bend piece 178 is integrated with the shape-regulating section 174. The shape-regulating section 174 is formed in a tongue-like shape, a thickness direction of the tongue-like shape is a radial direction of the clutch cover 68, and the tongue-like shape extends from the bend piece 178 along a rotational direction of the clutch cover 68. As illustrated in FIG. 14, the shape-regulating section 174 is inclined toward the support section 94 side with respect to a direction orthogonal to the axial direction of the clutch cover 68.

Further, the shape-regulating section 174 is formed so as to gradually grow wider in the axial direction of the clutch cover 68 toward a proximal end section of the shape-regulating section 174 from a leading end section thereof. A wide section 180 that is wider than a leading end section of the shape-regulating section 174 is provided on the proximal end section side of the shape-regulating section 174. Originally, the wide section 180 is formed to be wider than a radius of the coil spring 74. The wide section 180 is fitted with the other axial-direction end section 74B of the coil spring 74 by being inserted into the other axial-direction end section 74B of the coil spring 74.

Still further, the second locking sections 172 are provided at both sides of the shape-regulating section 174 in the axial direction of the clutch cover 68 respectively. The pair of second locking sections 172 is formed by regions that are a part of the bend piece 178 and are located at both sides of the shape-regulating section 174 in the axial direction of the clutch cover 68. Among the pair of second locking sections 172, one region of the second locking sections 172 located on a proximal end section side of the bend piece 178 is located on the leading end section side of the shape-regulating section 174 with respect to the other region of the second locking sections 172 located on a leading end section side of the bend piece 178. An outer locking section 118, which extends outward in the radial direction of the clutch cover 68, is provided at the leading end of the bend piece 178.

According to the constitution in which the second locking sections 172 are provided at both sides of the shape-regulating section 174 in the axial direction of the clutch cover 68 as in this modification, it is possible to support the other axial end section 74B of the coil spring 74 at two regions of the second locking sections 172 which are separated in the axial direction of the clutch cover 68. Thereby, it is possible to curve the coil spring 74 so as to be more convex to the support section 94 side.

Further, according to the constitution in which, among the pair of second locking sections 172, one region of the second locking sections 172 located on the proximal end section side of the bend piece 178 is located on the leading end section side of the shape-regulating section 174 with respect to the other region of the second locking sections 172 located on the leading end section side of the bend piece 178, it is possible to further incline the coil spring 74, which is to be locked at the pair of second locking sections 172, toward the support section 94 side with respect to the direction orthogonal to the axial direction of the clutch cover 68. Therefore, also for this reason, it is possible to curve the coil spring 74 so as to be more convex to the support section 94 side.

In this modification, the shape-regulating section 174 is provided with the wide section 180 on the proximal end section side of the shape-regulating section 174, the wide section 180 being wider than the leading end section of the shape-regulating section 174, and the wide section 180 is fitted with the other axial-direction end section 74B of the coil spring 74 by being inserted into the other axial-direction end section 74B of the coil spring 74. Therefore, since it is possible to keep the coil spring 74 held on the shape-regulating section 174 when assembling the clutch cover 68 and the clutch guide 64, it is possible to improve workability during the assembling.

Moreover, although not shown expressly, also in this modification, the contact surface 172A on the second locking sections 172 that contacts the coil spring 74 may face toward the projecting direction of the shape-regulating section 174. According to such a constitution, for example, in comparison with a case where the contact surface 172A extends along the axial direction of the clutch cover 68 (for example, refer to FIG. 14), the coil spring 74 can be curved so as to be more convex to the support section 94 side.

Hereinabove, although description is made of the embodiments of the present invention, the present invention is not limited to the above description. As a matter of course, the present invention may be carried out in other various modes without departing from the spirit of the present invention.

Further, the embodiments of the present invention is applicable to a clutch for energy absorbing mechanisms in other webbing take-up devices (for example, a retractor in which a lock ring and a frame are integrated with each other so that a webbing-belt load during a force limitation (during an energy absorption) can be adjusted at two stages).

What is claimed is:

1. A webbing take-up device comprising:
a spool that takes up a webbing belt;
a lock member that is arranged coaxially with the spool, and that is fixed to the spool so as to be rotatable integrally with the spool;
a clutch cover that is arranged coaxially with the lock member, and that is fixed to the lock member so as to be rotatable integrally with the lock member;
a clutch guide that is arranged in an axial direction of the lock member so as to face the clutch cover, and that is supported so as to be rotatable relatively to the lock member;
a coil spring provided in a compressed state between a first locking section provided at the clutch guide and a second locking section provided at the clutch cover, and that urges the clutch guide in a rotational direction with respect to the clutch cover, the spring-contacting portions of the first and second locking sections being offset from one another in the axial direction;
a support section that is formed at the clutch guide, and that supports one axial-direction end section of the coil spring from a side facing the clutch cover in an axial direction of the clutch guide; and
a shape-regulating projection that is projected along an axis with respect to the second locking section so as to be inserted into the other axial-direction end section of the coil spring, and that is inclined along its axis toward a support section wall with respect to a direction orthogonal to an axial direction of the clutch cover, the coil spring being curved along a plane parallel to the axial direction so that a side of the coil spring is convex to and in direct engagement with the support section wall.

2. The webbing take-up device according to claim 1, wherein a contact surface on the second locking section that contacts the coil spring faces a direction to which the shape-regulating section is projected.

3. The webbing take-up device according to claim 1, wherein the clutch cover has a body section that faces the clutch guide in the axial direction of the clutch guide, and a bend piece that extends from the body section and that is bent so that the bend piece is along the axial direction of the clutch cover, the shape-regulating section is formed in a tongue-like shape of which a thickness direction is a radial direction of the clutch cover and which extends from the bend piece along a rotational direction of the clutch cover, and the second locking section is formed by regions that are a part of the bend piece and are located at both sides of the shape-regulating section in the axial direction of the clutch cover.

4. The webbing take-up device according to claim 3, wherein said regions of the second locking section are located on a proximal end section side of the bend piece.

5. The webbing take-up device according to claim 1, wherein the shape-regulating section is provided with a wide section, that is formed on a proximal end section side of the shape-regulating section to be wider than a leading end section of the shape-regulating section and that is fitted with the other axial-direction end section of the coil spring by being inserted into the other axial-direction end section of the coil spring.

6. The webbing take-up device according to claim 1, wherein the first locking section includes a spring-retaining surface that engages without extending into an end of the coil spring.

* * * * *